United States Patent [19]

Igoe et al.

[11] 4,374,155

[45] Feb. 15, 1983

[54] YOGURT MILK SHAKE

[75] Inventors: Robert S. Igoe; Richard J. Taylor, both of San Diego, Calif.

[73] Assignee: Merck & Co. Inc., Rahway, N.J.

[21] Appl. No.: 239,747

[22] Filed: Mar. 2, 1981

[51] Int. Cl.³ .................... A23C 9/13; A23C 9/137; A23C 23/00

[52] U.S. Cl. .................... 426/569; 426/564; 426/580; 426/583; 426/590

[58] Field of Search ............ 426/34, 42, 43, 564, 426/565, 569, 570, 583, 590, 584

[56] References Cited

U.S. PATENT DOCUMENTS

| | | | |
|---|---|---|---|
| 3,479,187 | 11/1969 | Arbuckle | 426/569 |
| 3,726,690 | 4/1973 | Schuppner, Jr. | 426/583 |
| 3,914,440 | 10/1975 | Witzig | 426/565 X |
| 3,978,243 | 8/1976 | Pedersen | 426/573 |
| 4,031,264 | 6/1977 | Arolski et al. | 426/590 |
| 4,046,925 | 9/1977 | Igoe et al. | 426/573 |
| 4,081,567 | 3/1978 | Haber | 426/584 X |
| 4,169,854 | 10/1979 | Igoe | 426/583 |
| 4,206,244 | 6/1980 | Schenk | 426/583 |
| 4,242,347 | 12/1980 | Ingoe | 426/565 X |
| 4,282,262 | 8/1981 | Blake | 426/565 |

FOREIGN PATENT DOCUMENTS

1476309 8/1973 United Kingdom .

OTHER PUBLICATIONS

"Do Sour Milk Drinks Have a Future?", Seminar presented by IFAG Interfrimulsion GmbH, Jan. 16–18, 1980, Lubeck.

Journal of American Oil Chemist's Society, vol. 56, No. 3, 3/79, C. W. Kolar et al.: "Vegetable protein application in yogurt coffee, creamers and whip toppings", pp. 389–391.

Primary Examiner—David M. Naff
Attorney, Agent, or Firm—Gabriel Lopez; Hesna J. Pfeiffer

[57] ABSTRACT

A composition containing yogurt is prepared which upon manual shaking produces a drink containing entrapped air having a milk shake appearance which is retained for about 30 minutes after shaking. The composition contains yogurt and milk in a yogurt: milk ratio of 80:20 to 53:47, a soya protein whipping agent, xanthan gum and/or CMC as a stabilizer and optionally sugar.

7 Claims, No Drawings

YOGURT MILK SHAKE

BACKGROUND OF THE INVENTION

The use of hydrocolloids in acidified milk products is well known. For example, Igoe (U.S. Pat. No. 4,046,925) teaches an acidified milk gel using a thickener system comprising carboxymethyl cellulose (CMC), locust bean gum (LBG), and xanthan gum. Schuppner (U.S. Pat. No. 3,726,690) teaches an acidified cream which is stabilized against serum separation with a mixture of LBG and xanthan gum. Haber (U.S. Pat. No. 4,081,567) teaches an acidified dry beverage mix which is reconstituted with cold milk. The mix contains starch, guar gum, and xanthan gum. In these products, the hydrocolloids have typically been used to thicken while also stabilizing them, i.e., preventing separation, whey-off, or co-aggulation of the milk protein under low pH conditions or the rigors of commercial processing.

A recently introduced concept in acidified milk products is the processed yogurt milk shake, i.e., a pasteurized yogurt product which upon shaking develops the froth characteristic of a milk shake. Such a product requires a foaming agent and stabilizer so that the product is stable, thickish in body, and retains its froth while being consumed.

SUMMARY OF THE INVENTION

It has now been found that a processed, stable yogurt milk shake mix can be prepared which upon shaking in its container, develops and retains a frothy appearance while being consumed if the product contains a soya protein foaming agent and a stabilizer comprising CMC, xanthan gum, or a mixture of CMC and xanthan gum. The product has improved characteristics if it is homogenized.

DETAILED DESCRIPTION OF THE INVENTION

The stabilized liquid phase of the yogurt milk shake of this invention comprises 73 to 99.45 wt% of yogurt and milk in the range of ratios of yogurt:milk of 80:20 to 53:47. When the amount of milk exceeds about 47%, there is an undesired reactivity in the form of precipitated milk proteins.

The foaming or whipping agent is a soya protein, a powder derived from soybeans. Representative agents are D-100, D0157A, and D-100WA Gunther's Whipping Agent (Protein Division of A. E. Staley Mfg. Co.). The whipping agent is used at a level of about 0.5 to 2.5%.

The stabilizer of this invention is xanthan gum, CMC, or a mixture of the two ranging from 0:100 to 100:0. If a mixture is used, a 2:1 CMC/xanthan gum mixture is preferred. The stabilizer is used at a level of about 0.05 to 0.5%. When xanthan gum is used as the sole stabilizer, levels of 0.05 to 0.4 are recommended; for CMC alone, use 0.15 to 0.5; and for 2:1 (CMC:xanthan gum) combinations, use 0.1 to 0.5% At stabilizer levels above 0.5%, the viscosity increase is too high and foam formation is adversely affected.

Yogurt milk shakes incorporating these stabilizers and whipping agents are stable against separation and retain their frothy character for about 30 minutes following about 15 seconds of shaking by hand.

For additional flavor, optional ingredients such as sugar (up to about 20%), fruits, and flavoring agents such as vanilla may also be incorporated into the yogurt milk shake.

Although the use of the stabilizer of this invention substantially eliminates graininess in the final product, a smoother texture and increased overrun can be obtained if the yogurt/milk mixture is homogenized or subjected to comparable high shear. Passing the mixture through a homogenizer such as a Manton-Gaulin model at 0-2500 psi effectively reduces graininess in the final product and promotes increase in overrun; pressures above 500 psi are preferred.

The invention is further defined by reference to the following examples, which are intended to be illustrative and not limiting.

In the following examples, samples were placed in approximately 200 ml sealed glass containers and hand shaken for about 15 seconds. The "% foam" is calculated by measuring the original and final heights of the liquids in the containers and using the formula:

$$\frac{\text{final height} - \text{original height}}{\text{original height}} \times 100 = \% \text{ foam.}$$

EXAMPLE 1

Effect of pH on Foam

To demonstrate the effect of pH on the ability of a milk product to foam, milk shake preparations are foamed with and without yogurt.

|  | % | % Foam |
|---|---|---|
| (A) Processed Shake (pasteurized, cooled, neutral pH) | | |
| Milk | 90.0 | 9 |
| Sugar | 10.0 | |
| Stabilizer (63% guar, 26% xanthan gum, 10.5% carageenan, 0.9% LBG) | 0.15 | |
| D100 | 0.5 | |
| (B) Instant Shake Prepared in Cold Milk | | |
| Milk | 91.5 | 18 |
| Sugar | 7.87 | |
| Xanthan gum[1] | 0.43 | |
| Shortening powder[2] | .20 | |
| (C) Modified Instant Shake Containing Yogurt | | |
| Milk | 45.75 | 0 |
| Yogurt (pH 4-4.4) | 45.75 | |
| KELTROL ® | .43 | |
| BEATREME ® 3458 | .20 | |

[1]KELTROL ® - Kelco Division, Merck & Co., Inc., San Diego, California.
[2]BEATREME ® 3458 - Beatrice Foods, Chicago, Illinois (60% hydrogenated, emulsified vegetable fat with added dextrin).

EXAMPLE 2

Effect of Whipping Agent

To demonstrate the effect of a whipping agent, yogurt milk shake preparations are made with and without whipping agent.

|  | % | % Foam |
|---|---|---|
| (A) Without Whipping Agent | | |
| Milk | 50.0 | 0 |
| Yogurt | 40.0 | |
| Sugar | 10.0 | |
| 2:1 CMC:KELTROL | 0.15 | |
| (B) With Whipping Agent | | |
| Milk | 50.0 | 18 |
| Yogurt | 40.0 | |

-continued

| | % | % Foam |
|---|---|---|
| Sugar | 10.0 | |
| 2:1 CMC:KELTROL | 0.15 | |
| D-100 | 1.00 | |

EXAMPLE 3

Comparative Stabilizer Compatabilities

To demonstrate the effectivity of the stabilizers of this invention in processed yogurt milk shake preparations, samples of 50% yogurt, 40% milk, and 10% sugar are prepared. Various stabilizers are added and observations are made for separation.

| Stabilizer | Reactivity Noticed on Beaker | Separation |
|---|---|---|
| 2:1 CMC:KELTROL (x.g.) | 0 | none–slight |
| KELTROL (xanthan gum) | 0 | trace |
| 63% guar 26% xanthan gum/10.5% carageenan 0.9% LBG | Ppt | apparent |
| Guar | Ppt | apparent |
| KELTROL/pectain | Ppt | apparent |

EXAMPLE 4

Minimum Stabilizer

In a 40:50 yogurt:milk preparation with 10% sugar, separation is observed on cooling after pasteurization. The addition of 0.15% 2:1 CMC:xanthan gum to the preparation prior to pasteurization prevents separation. To a 30:60 yogurt:milk preparation with 10% sugar, the addition of 0.01% xanthan gum does not prevent separation whereas 0.1% xanthan gum does.

EXAMPLE 5

Effect of Homogenization

Yogurt/milk (40.0/48.8) preparations with 10% sugar, 0.1% stabilizer, and 1% whipping agent are homogenized at 1000 psi. A similar preparation is not homogenized. A difference in texture and overrun is observed.

| | Stabil. | Visc. (cP) | % Foam | Texture |
|---|---|---|---|---|
| Homogenized | KETROL | 135 cP | 30 | smooth |
| Un-homogenized | KETROL | 120 cP | 20 | sl. grainy |
| Homogenized | 2:1 CMC:x.g. | 80 | 40 | smooth |
| Un-homogenized | 2:1 CMC:x.g. | 45 | 20 | sl. grainy |

EXAMPLE 6

Effect of Yogurt:Milk Ratio

To demonstrate the effect of the ratio of yogurt to milk, preparations of various proportions are made and stabilized with 0.1% xanthan gum. Reactivity is observed.

| | % | Foam | Reactivity |
|---|---|---|---|
| Milk | 60 | 40% | apparent |
| Yogurt | 40 | | |
| Milk | 50 | 40% | apparent |
| Yogurt | 50 | | |
| Milk | 45 | 40% | slight |
| Yogurt | 55 | | |
| Milk | 40 | 40% | slight |
| Yogurt | 60 | | |
| Milk | 35 | 40% | minimal |
| Yogurt | 65 | | |
| Milk | 30 | 30% | minimal |
| Yogurt | 70 | | |

Thus, levels of yogurt greater than 50% are required to minimize milk protein reactivity.

The yogurt milk shake of this invention could be sold commercially in ½ pint to 1 pint containers sealed with sufficient headspace to allow for shaking by the end user/consumer, whereby the air in the headspace is entrapped in the yogurt/milk mixture to produce the final product: a thickish, frothy shake.

The yogurt milk shake composition comprises:

| | Wt. % |
|---|---|
| Milk | 20–47 |
| Yogurt | 53–80 |
| Sugar | 0–20 |
| Soya Protein Whipping Agent* | 0.5–2.5 |
| Stabilizer: | 0.05–0.5 |
| Xanthan gum | 0.05–0.4 |
| CMC | 0.15–0.5 |
| (2:1) CMC:xanthan gum | 0.1–0.5 |

*Commercially available blended with sugar and/or sodium hexametaphosphate. Such blends are useful in the practice of this invention.

A preferred composition comprises:

| | Wt. % |
|---|---|
| Milk | 25–35 |
| Yogurt | 65–75 |
| Sugar | 8–12 |
| Whipping Agent | 1–1.5 |
| Stabilizer | 0.1–0.4 |
| Xanthan gum | 0.10–0.15 |
| CMC | 0.30–0.40 |
| (2:1) CMC:xanthan gum | 0.30–0.40 |

The following is a typical manufacturing procedure:
1. Add stabilizer blended with 5–10 times its weight in sugar to milk under mixing.
2. Add yogurt.
3. Add remaining sugar, whipping agent.
4. Pasteurize.
5. Homogenize (500–2500 psi range).
6. Package.
7. Cool.

What is claimed is:

1. A yogurt milk shake composition comprising:
    (a) 73 to 99.45wt.% of yogurt and milk in the range yogurt:milk 80:20 to 53:47;
    (b) 0.5 to 2.5 wt. % of a soya protein whipping agent; and
    (c) 0.05% to 0.5 wt. % of a stabilizer which consists essentially of CMC and xanthan gum.

2. A composition of claim 1 which has been homogenized at 500 to 2500 psi.

3. A composition of claim 2 comprising yogurt and milk in the ratio of 65:35 to 70:30 and 1 to 1.5 wt. % whipping agent.

4. A composition of claim 2 wherein the amount of CMC is 0.15 to 0.5 wt. %.

5. A composition of claim 2 wherein the amount of xanthan gum is 0.05 to 0.4 wt. %.

6. A composition of claim 2 wherein the stabilizer is 0.3 to 0.4 wt. % of 2:1 CMC:xanthan gum.

7. A composition of claim 1 comprising:
 (a) yogurt and milk in the ratio 15.25 to 65:35;
 (b) 8-12 wt. % sugar;
 (c) 1-1.5 wt. % soya protein whipping agent; and
 (d) 0.1 to 0.15% xanthan gum, and which composition has been homogenized at 500-1000 psi.

* * * * *